(12) United States Patent
Loehr et al.

(10) Patent No.: US 10,434,945 B2
(45) Date of Patent: Oct. 8, 2019

(54) METHOD AND DEVICE FOR DISPLAYING AN IMAGE OF THE SURROUNDINGS OF A VEHICLE COMBINATION

(71) Applicant: Conti Temic microelectronic GmbH, Nuremberg (DE)

(72) Inventors: Felix Loehr, Koblenz (DE); Joerg Schrepfer, Tettau (DE)

(73) Assignee: Conti Temic microelectronic GmbH, Nuremberg (DE)

( * ) Notice: Subject to any disclaimer, the term of this patent is extended or adjusted under 35 U.S.C. 154(b) by 0 days.

(21) Appl. No.: 15/876,581

(22) Filed: Jan. 22, 2018

(65) Prior Publication Data
US 2018/0141496 A1 May 24, 2018

Related U.S. Application Data

(63) Continuation of application No. PCT/DE2016/200313, filed on Jul. 11, 2016.

(30) Foreign Application Priority Data

Jul. 31, 2015 (DE) .................. 10 2015 214 611

(51) Int. Cl.
*B60W 30/00* (2006.01)
*B60R 1/00* (2006.01)
*G06T 19/00* (2011.01)

(52) U.S. Cl.
CPC .............. *B60R 1/00* (2013.01); *B60W 30/00* (2013.01); *G06T 19/006* (2013.01);
(Continued)

(58) Field of Classification Search
CPC ........ B60R 2300/607; B60R 2300/303; B60R 1/003
(Continued)

(56) References Cited

U.S. PATENT DOCUMENTS

2008/0239527 A1  10/2008 Okabet et al.
2013/0107045 A1* 5/2013 Soderlind .................. B60R 1/04
                                                                                    348/148
(Continued)

FOREIGN PATENT DOCUMENTS

DE       102008030104 A1    2/2009
JP           2003235036 A    8/2003
(Continued)

OTHER PUBLICATIONS

International Search Report and Written Opinion dated Nov. 4, 2016 from corresponding International Patent Application No. PCT/DE2016/200313.
(Continued)

*Primary Examiner* — Thomas J Lett (57) ABSTRACT

The invention relates to a method and a device for displaying an image of the surroundings of a combination of two vehicles that are coupled to one another. According to the invention, image data is sensed by sensors on both of the combined vehicles. Taking into account the three-dimensional position of the vehicles relative to one another, the image data is then combined so as to obtain a common image of the surroundings. The obtained common image of the surroundings allows a driver/operator to efficiently and safely perceive the surroundings around the entire vehicle combination.

14 Claims, 3 Drawing Sheets

(52) U.S. Cl.
CPC ... *B60R 2300/105* (2013.01); *B60R 2300/303* (2013.01); *B60R 2300/50* (2013.01); *B60R 2300/60* (2013.01); *B60R 2300/80* (2013.01)

(58) Field of Classification Search
USPC ........................................................ 345/419
See application file for complete search history.

(56) References Cited

U.S. PATENT DOCUMENTS

| | | | |
|---|---|---|---|
| 2013/0236858 A1* | 9/2013 | Lin | G09B 19/167 434/66 |
| 2014/0085472 A1 | 3/2014 | Lu et al. | |
| 2015/0286878 A1* | 10/2015 | Molin | G06K 9/20 348/148 |
| 2016/0049020 A1* | 2/2016 | Kuehnle | G07C 5/0808 701/34.4 |
| 2016/0366336 A1* | 12/2016 | Kuehnle | H04N 5/23238 |

FOREIGN PATENT DOCUMENTS

| | | |
|---|---|---|
| JP | 2005184225 A | 7/2005 |
| JP | 2006256544 A | 9/2006 |
| JP | 2012105158 A | 5/2012 |
| WO | 02/09433 A1 | 1/2002 |
| WO | 2015/001054 A2 | 1/2015 |

OTHER PUBLICATIONS

Search Report dated Apr. 26, 2016 from corresponding German Patent Application No. 10 2015 214 611.1.

* cited by examiner

METHOD AND DEVICE FOR DISPLAYING AN IMAGE OF THE SURROUNDINGS OF A VEHICLE COMBINATION

BACKGROUND

The invention relates to a method and a device for displaying an image of the surroundings, in particular the image of the surroundings of a vehicle. In addition, the invention relates to a surround view system for a vehicle combination.

Vehicles are increasingly being equipped with rear view systems or surround view systems which calculate a display image from camera images, which display image supports the driver of a vehicle during the performance of driving maneuvers such as, for example, during parking or reversing. The view of a vehicle driver is, as a rule, restricted especially during reversing, so that thanks to the support of the display system he is able to take decisions in order to maneuver his vehicle safely. As a result of the display of processed camera images, the driver can, in this case, be provided with an image of the vehicle surroundings, which is as realistic as possible. As a result, it is possible to support the driver efficiently during his driving maneuvers.

On a vehicle combination, in which a towing vehicle is coupled to a trailer, a camera directed backwards on the towing vehicle generally senses, to a large extent, the trailer. In this case, the trailer obscures the view of the further surrounding area at the rear. A camera system, in which cameras are exclusively arranged on the towing vehicle, cannot therefore allow a sufficient rear view for such a vehicle combination. Therefore, an additional camera is occasionally arranged on the trailer. If the images of this camera on the trailer are displayed to a driver/operator in the towing vehicle, this may possibly lead to confusion since the alignment of the camera on the trailer does not correspond to the alignment of the towing vehicle.

It is therefore an object of the invention to provide a method and a device for displaying an image of the surroundings of a vehicle combination, in which the image of the surroundings around the entire vehicle combination can be shown as completely and realistically as possible, so that the driver is efficiently supported in his driving decisions and orientation.

This object is achieved according to the invention by a method having the features indicated in claim 1.

The invention therefore provides a method for displaying an image of the surroundings of a vehicle combination, having the steps of providing first image data sensed by sensors and providing second image data sensed by sensors. The first image data is, in this case, sensed and provided by means of a vehicle sensor unit arranged on a first vehicle. The second image data is sensed and provided by means of a second vehicle sensor unit arranged on a second vehicle. The first vehicle and the second vehicle can, in this case, be mechanically coupled to one another and consequently form a vehicle combination. The vehicle further includes a step to establish a three-dimensional position of the second vehicle in relation to the first vehicle; and combining the first image data and the second image data using the established three-dimensional position of the second vehicle in relation to the first vehicle. As a result of combining the first image data and the second image data, an image of the surroundings of the vehicle combination is obtained in this case. The obtained image of the surroundings is then displayed on a vehicle display.

The invention further provides a device for displaying an image of the surroundings of a vehicle combination having the features indicated in claim 11.

The invention therefore provides a device for displaying an image of the surroundings of a vehicle combination having a first vehicle sensor unit, a second vehicle sensor unit and a calculation unit. The first vehicle sensor unit is arranged on a first vehicle and is designed to provide first image data. The second vehicle sensor unit is arranged on a second vehicle and is designed to provide two image data. The first vehicle and the second vehicle can be mechanically coupled to one another and thus form a vehicle combination. The calculation unit is designed to establish a three-dimensional position of the second vehicle in relation to the first vehicle. The calculation unit is further designed to combine first image data and second image data using the established three-dimensional position of the second vehicle in relation to the first vehicle. As a result, an image of the surroundings of the vehicle combination is obtained. The obtained image of the surroundings can be displayed on a vehicle display connected to the calculation unit.

The idea which forms the basis of the invention is to obtain a common image of the surroundings for a combination of two vehicles that are coupled to one another. To this end, image data originating both from image sensors, which are arranged in a clamped manner on a towing vehicle of the vehicle, and image data originating from image sensors, which are arranged on the trailer of the vehicle combination, can be combined with one another. All of this image data is, in this case, transferred into a common reference system. This common reference system is preferably a reference system based on the towing vehicle. In this way, a driver/operator in the towing vehicle can perceive a thus represented image of the surroundings particularly easily and can subsequently make decisions efficiently regarding driving maneuvers.

As a result of the combination of image data originating from image sensors of both the towing vehicle and the trailer, a particularly large area of the surroundings around the entire vehicle combination can, in this case, be sensed and shown. In particular, those image areas which are obscured by a trailer can consequently also be shown to a driver/operator in a towing vehicle. As a result, a safe maneuvering of the vehicle combination is made possible, in particular during reversing.

The evaluation of the three-dimensional position between the two vehicles of such a vehicle combination during the combination of the image data makes it possible, in this case, to combine all of the image data particularly well and particularly reliably. In particular, the image data of a camera system arranged on a trailer can, as a result, be translated very well into the reference system of the towing vehicle.

According to one embodiment, image areas of the first vehicle sensor unit and of the second vehicle sensor unit overlap at least partially. Due to the at least partial overlapping of the image areas of the vehicle sensor units, it is possible to achieve an imaging of the vehicle surroundings, which is as complete as possible. In addition, overlapping image areas of individual vehicle sensor units also make it possible, thanks to the analysis of the overlapping areas, to combine the image data so as to obtain a particularly good common image of the surroundings.

According to one embodiment, the step to establish the three-dimensional position of the second vehicle in relation to the first vehicle detects the second vehicle in the first image data provided. Based on the detection result for the detection of the second vehicle in the first image data, the three-dimensional position of the second vehicle can subsequently be established in relation to the first vehicle. In this way, it is possible to use the image data of the first vehicle sensor unit in order to establish the position of the second vehicle in relation to the first vehicle. Consequently, no additional separate sensors, which detect the three-dimensional position of the two vehicles relative to one another, are required.

According to another embodiment, establishing the three-dimensional position of the second vehicle in relation to the first vehicle includes establishing an angle and/or a distance between the first vehicle and the second vehicle. The established angle between the first vehicle and the second vehicle can, for example, be the angular position of a trailer drawbar. As a result of establishing the angular position between the two vehicles and the distance between the two vehicles, the three-dimensional position of the second vehicle and consequently also the position of the second vehicle sensor unit in relation to the first vehicle or respectively the first vehicle sensor unit can be clearly determined.

According to another embodiment, the method for displaying an image of the surroundings of a vehicle combination includes a step to obtain a graphical representation of the second vehicle. The obtained graphical representation of the second vehicle can subsequently be integrated into the obtained image of the surroundings. For example, the obtained graphical representation of the second vehicle can be semi-transparently inserted into the obtained image of the surroundings. Likewise, it is possible to show, for example, the outer contours of the second vehicle in the obtained image of the surroundings as lines or similar. In this way, a driver/operator additionally receives information regarding the position of the second vehicle in the surroundings, in the image of the surroundings shown.

According to one embodiment, a three-dimensional model of the second vehicle is obtained in the step to obtain a graphical representation of the second vehicle. First image data of the second vehicle can then be projected onto outer surfaces of the obtained three-dimensional model of the second vehicle. Consequently, a particularly realistic representation of the second vehicle in the image of the surroundings is possible.

According to another embodiment, the method for displaying an image of the surroundings of a vehicle combination includes a step to transform the first image data sensed by sensors and the second image data sensed by sensors into a predetermined projection surface. The step to combine the first image data and the second image data can subsequently obtain the image of the surroundings using the transformed first image data and the transformed second image data. The transformation into a predetermined projection surface can, for example, involve a projection of the image data into a bird's eye view, a transformation of the image data into the plane of the road on which the first vehicle and the second vehicle are located, a projection of the image data onto the outer surfaces of the second vehicle or any other projection surface/plane. Thanks to the transformation of the image data into a predefined projection surface prior to the combination, it is subsequently possible to combine the image data particularly easily.

According to another embodiment, the method for displaying an image of the surroundings of a vehicle combination includes a step to transform the obtained image of the surroundings into a predetermined perspective. Thanks to the transformation of the obtained image of the surroundings into a predetermined perspective, for example into a bird's eye perspective or any other projection plane, the combined image data can be shown to a driver/operator in a view which makes it possible to perceive the image data particularly efficiently.

According to another embodiment, the first image data and the second image data are in each case supplied by at least one camera of the first vehicle sensor unit or respectively of the second vehicle sensor unit. Alternatively, vehicle sensor units having more than one camera are also possible.

According to another embodiment, the method for displaying an image of the surroundings includes a step to calculate extrinsic parameters of the second vehicle sensor unit. In particular, this step can include calculating extrinsic camera parameters of a camera of the second vehicle sensor unit. The extrinsic camera parameters describe the position and orientation of the second vehicle sensor unit in the space, in particular the position and orientation of the second vehicle sensor unit in relation to the first vehicle or respectively the first vehicle sensor unit. The extrinsic camera parameters can, in this case, include a translation of the second vehicle sensor unit in relation to the first vehicle sensor unit in the x-, y- and z-directions as well as rotation about the x-axis, the y-axis and the z-axis.

According to another embodiment, the extrinsic parameters of the second vehicle sensor unit are calculated in real time. In particular, the extrinsic parameters can be calculated separately for each image (frame) a camera of the second vehicle sensor unit.

According to another embodiment, the device for displaying an image of the surroundings of a vehicle combination includes a graphics processing unit (GPU). Graphics processing units are particularly well suited to processing image or respectively graphic data efficiently. In this way, a distortion correction of the image data provided by the first vehicle sensor unit or respectively the second vehicle sensor unit, a transformation of the image data into a desired perspective, the determination of the extrinsic camera parameters as well as the particularly efficient combination of the first image data and the second image data by a corresponding graphics processing unit are made possible. In particular, the processing of the corresponding data in real time is made possible by the use of a graphics processing unit.

According to another embodiment, the device for displaying an image of the surroundings further includes a position sensor which is designed to sense an angle and/or a distance between the first vehicle and the second vehicle. The angle or respectively distance thus sensed can then be provided to the calculation unit. Using an external or respectively separate position sensor unit makes it possible to evaluate the angle or respectively distance between the first vehicle and second vehicle simply and precisely.

According to another embodiment, the first vehicle sensor unit and/or the second vehicle sensor unit respectively include(s) at least one vehicle camera.

The invention further provides a surround view system for a vehicle combination having a first vehicle and a second vehicle mechanically coupled to the first vehicle. The surround view system includes a device for displaying an image of the surroundings according to the invention and a vehicle display which is arranged in the first vehicle and which is designed to display the obtained image of the surroundings.

Further embodiments and advantages of the invention are set out by the following description, with reference to the attached drawings, wherein:

DETAILED DESCRIPTION

Figure 1:
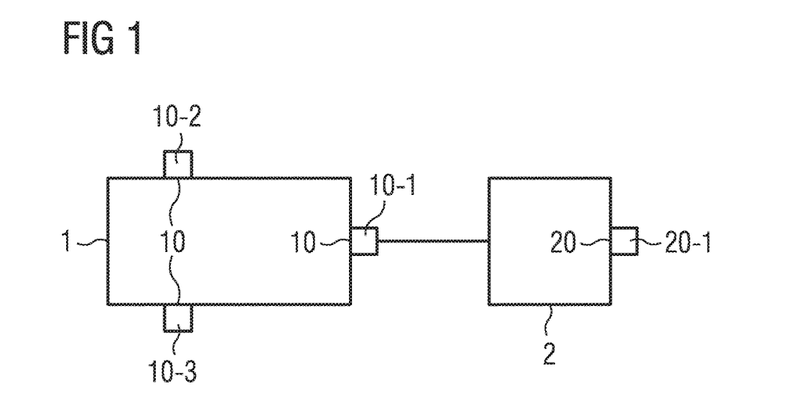
FIG. 1: shows a schematic representation of a vehicle combination.

FIG. 1 shows a schematic representation of a combination of a first vehicle 1 and a second vehicle 2. The first vehicle 1 and the second vehicle 2 are, in this case, mechanically coupled to one another. The vehicle combination can, in this case, be any combination of two vehicles. For example, the first vehicle 1 can be a car, to which a trailer is coupled. Likewise, the vehicle combination can also consist of a truck having a corresponding trailer or a tractor unit having a semitrailer. In addition, the invention is not restricted to the combinations described previously, but can also relate to any combinations of two vehicles that are coupled to one another. In addition to road-going combinations of two vehicles that are coupled to one another, further combinations are additionally possible, for example also watercraft made up of a combination of thrust-propelled or towed vehicles. In order to make the invention more understandable, it will be explained in greater detail below with reference to a combination of a first vehicle 1 in the form of a towing vehicle and a second vehicle 2 in the form of a trailer coupled to the towing vehicle.

In this case, a first vehicle sensor unit 10 is arranged on the first vehicle 1. In this case, this first vehicle sensor unit 10 can, in particular, include one or more vehicle cameras 10-$i$. In addition, the first vehicle sensor unit 10 can also include additional sensors, in particular imaging sensors. In the example shown here, the vehicle sensor unit 10 includes a reversing camera 10-1, as well as two side cameras 10-2 and 10-3. For example, the reversing camera 10-1 can be arranged on a rear bumper or a tailgate of the first vehicle 1. In addition, any other positions which make it possible to perceive the rear surroundings of the first vehicle 1 are also possible. The two side cameras 10-2 and 10-3 are each arranged on the left or respectively right side of the vehicle 1. For example, the two lateral cameras 10-2 and 10-3 can be arranged on the outer mirror of the vehicle 1. In addition, any other lateral positions are also possible for mounting these cameras. The first vehicle sensor unit 10 can further include additional cameras. For example, the first vehicle sensor unit 10 can also include a camera which is directed forwards (not shown here). The cameras 10-$i$ can, in this case, be cameras having a very wide aperture angle. In particular, cameras having a so-called fisheye lens are possible. In order to sense as large an outer area around the vehicle 1 as possible, the individual cameras 10-$i$ can, in this case, have at least an aperture angle of 180° and possibly even greater in the horizontal direction.

Similarly to the first vehicle sensor unit 1 having the corresponding vehicle cameras 10-$i$, a second vehicle sensor unit 20 is also arranged on the second vehicle 2 coupled to the first vehicle 1. In the embodiment example shown here, the second vehicle sensor unit 20 only includes one camera 20-1. In addition, the second vehicle sensor unit 20 can, however, also include multiple vehicle cameras. For example, it is also possible to arrange additional cameras (not shown here) on the second vehicle 2, in addition to the rear camera 20-1 shown, on the outer sides as well. The embodiments, as already described in connection with the cameras 10-$i$ of the first vehicle sensor unit 10, also apply to the cameras of the second vehicle sensor unit 20. In particular, the camera of the second vehicle sensor unit 20 can also have an aperture angle of 180° or more, at least in the horizontal direction.

The second image data can, in this case, be transmitted to the first vehicle 1 using any method, either wirelessly or non-wirelessly. For example, non-wireless transmission by means of a digital bus system is possible. In addition, wireless transmission of the image data by means of radio or similar is also possible. For example, the image data can be transmitted by means of Bluetooth, WLAN or another radio standard.

Figure 2:
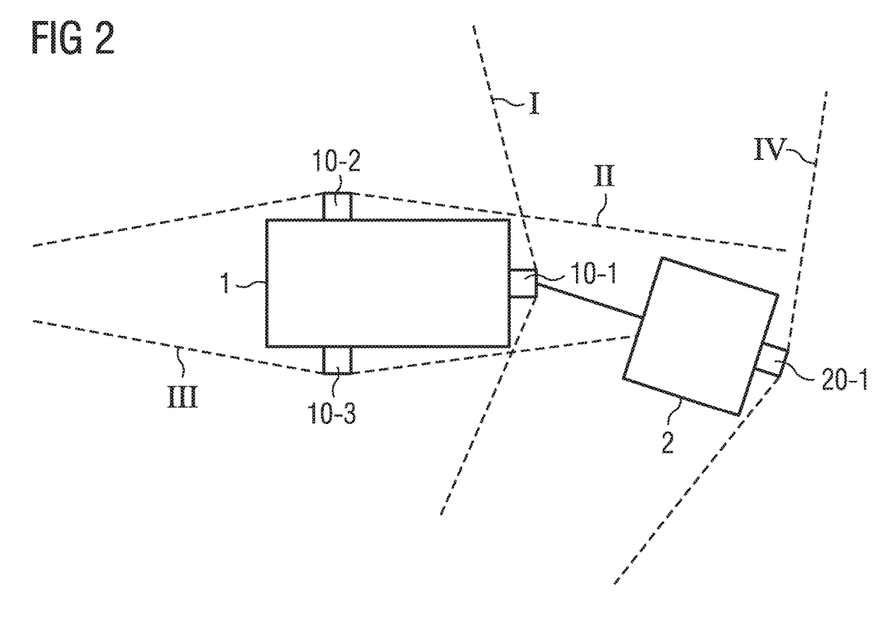
FIG. 2: shows a schematic representation of the sensing areas of the vehicle sensor units, as they form the basis of an embodiment of the invention.

FIG. 2 shows a schematic representation of the horizontal image areas of the vehicle cameras 10-$i$ and 20-$i$ of the first vehicle sensor unit 10 and of the second vehicle sensor unit 20. The sensing range of the rear camera 10-$i$ of the first vehicle sensor unit 10 on the first vehicle 1 is, in this case, identified with "I". The lateral sensing ranges of the side cameras 10-2 and 10-3 of the first vehicle sensor unit 10 of the first vehicle 1 are identified with "II" and "III". The sensing range of the rear camera 20-1 of the second vehicle sensor unit 20 on the second vehicle 2 is identified with "IV". As can be seen from this representation, such an arrangement of the cameras 10-$i$ and 20-$i$ of the first vehicle sensor unit 10 and of the second vehicle sensor unit 20, even in the case of a second vehicle 2 being angled in relation to the first vehicle 1, renders it possible to sense a very large area of the surroundings around the combination of the first vehicle 1 and second vehicle 2. As a result of the arrangement, if applicable, of additional cameras on the second vehicle 2, the sensing area can, in addition, be further supplemented, especially in the case of an angled second vehicle 2.

Figure 3:
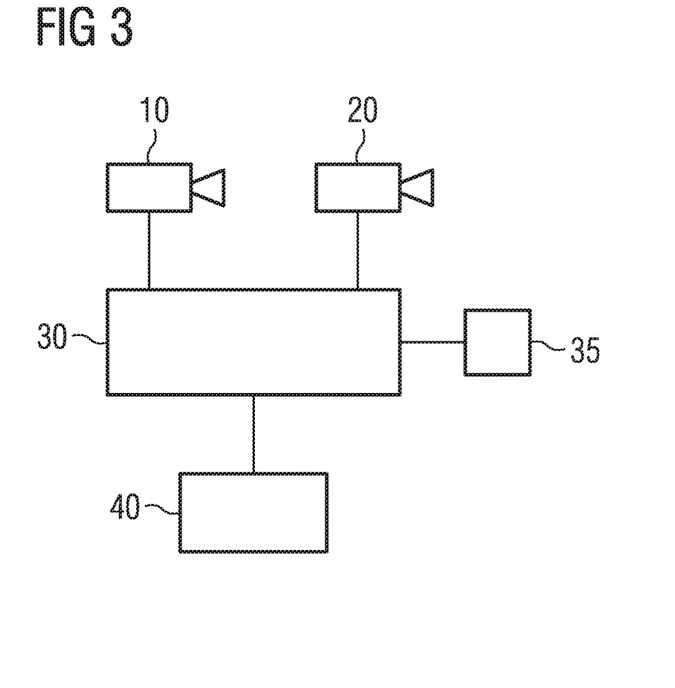
FIG. 3: shows a schematic representation of a device for displaying an image of the surroundings according to one embodiment.

FIG. 3 shows a schematic representation of a device for displaying an image of the surroundings of a vehicle combination according to one embodiment. As previously described, the areas around the first vehicle 1 can, in this case, be sensed by one or more cameras 10-$i$ of a first vehicle sensor unit 10. In this case, the first vehicle sensor unit 10 on the first vehicle 1 provides first image data sensed by sensors. This image data can, for example, include a sequence of periodically sensed individual images of the individual vehicle cameras 10-$i$. In this case, the individual cameras 10-$i$ of the first vehicle sensor unit 10 preferably provide the individual camera images with a common image refresh rate. This image refresh rate can, in this case, be constant. Alternatively, it is also possible to adjust the image refresh rate as a function of additional parameters such as, for example, the vehicle speed or similar. Furthermore, image data of the surroundings of the second vehicle 2 is also provided by one or more vehicle cameras 20-$i$ of the second vehicle sensor unit 20 on the second vehicle 2. This image data can also be individual images or a sequence of consecutive images having a fixed or variable image refresh rate. The image data provided by the second vehicle sensor unit 20, in this case, preferably has the same image refresh rate as the image data provided by the first vehicle sensor unit 10.

The first vehicle sensor unit 10 and the second vehicle sensor unit 20 provide their image data, in this case, to a calculation unit 30. The image data provided by the individual cameras 10-*i* and 20-*i* is processed in the calculation unit 30 and combined so as to obtain a common image of the surroundings. The process for obtaining a common image of the surroundings is described in even greater detail below. After the image data of the first vehicle sensor unit 10 and of the second vehicle sensor unit 20 has been combined in the calculation unit 30 so as to obtain a common image of the surroundings, the common image of the surroundings can be displayed on the display unit 40. Additionally or alternatively, it is also possible to evaluate the image of the surroundings processed in this way by a component of a driver assistance system and, based on the evaluation, to intervene, if necessary, in the handling of the combination, in particular of the first vehicle 1, by means of which the combination is controlled.

In order to obtain the image of the surroundings in the calculation unit 30, the first image data of the first vehicle sensor unit 10 and the second image data of the second vehicle sensor unit 20 are, in this case, combined in a common reference system. In this case, the second image data of the second vehicle sensor unit 20 is preferably transferred into the reference system of the first vehicle 1 having the first vehicle sensor unit 10. This results in a representation for the obtained image of the surroundings, which representation includes both the first image data of the first vehicle sensor unit 10 and the second image data of the second vehicle sensor unit 20 and, in this case, shows the surroundings of the vehicle combination from the view of the first vehicle 1. This allows a driver/operator in the first vehicle 1 to perceive the vehicle surroundings efficiently and simply.

Since, during the maneuvering of the combination having the first vehicle 1 and the second vehicle 2 which is mechanically coupled to the first vehicle 1, the location of the second vehicle 2 in relation to the first vehicle 1 can change, the three-dimensional position of the two vehicles 1 and 2 relative to one another has to be established in each case prior to the combination of the first image data and the second image data. To this end, the location of the second vehicle 2 in relation to the first vehicle 1 can, for example, be sensed by means of a position sensor unit 35. In particular, an angle $\alpha$, which specifies an angular position of the second vehicle in relation to the first vehicle 1, can in this case be sensed. Additionally or alternatively, the position sensor unit 35 can also sense a distance between the first vehicle 1 and the second vehicle 2 and provide this to the calculation unit 30.

In addition to the sensing of the three-dimensional position of the second vehicle 2 in relation to the first vehicle 1 by means of a position sensor unit 35, it is additionally or alternatively also possible to establish the position of the second vehicle 2 in relation to the first vehicle 1 using the image data sensed by sensors, in particular the first image data of the first vehicle sensor unit 10. To this end, the calculation unit 30 can detect an object in the first image data provided by the first vehicle sensor unit 10. If, during this object detection, a second vehicle 2 is detected in the first image data of the first vehicle sensor unit 10, the three-dimensional position of the second vehicle 2 in relation to the first vehicle 1 can be inferred from the position of the second vehicle 2 detected in the first image data. By analyzing the size and the position of the detected vehicle 2 in the first image data, the distance between the first vehicle 1 and the second vehicle 2 as well as the angular position between the first vehicle 1 and the second vehicle 2 can be inferred. In addition, further methods or respectively sensors for establishing the three-dimensional position between the first vehicle 1 and the second vehicle 2 are also possible. For example, the three-dimensional position between the first vehicle 1 and the second vehicle 2 can also be established by means of radar, ultrasound, light sensors or similar.

The position of the second vehicle sensor unit 20 and the position of the cameras 20-*i* of the second vehicle sensor unit 20 can consequently be inferred from the three-dimensional position of the second vehicle 2 in relation to the first vehicle 1. In particular, a set of extrinsic parameters for the second vehicle sensor unit 20 can be established by the previously described sensor technology or respectively analysis of the first image data. These extrinsic parameters of the second vehicle sensor unit 20 can, in this case, for example describe a translational misalignment in the spatial directions (x-, y-, z-axes) as well as, if applicable, rotations about the spatial axes as well. The established extrinsic parameters of the second vehicle sensor unit 20 correspond, in this case, to extrinsic camera parameters for a processing of the image data of the second vehicle sensor unit 20. If the second vehicle sensor unit 20 includes, in this case, more than one camera 20-*i*, separate extrinsic camera parameters can thus be established for each of these cameras 20-*i*.

If, in this case, sequences of images with multiple consecutive images are provided by the first vehicle sensor unit 10 and the second vehicle sensor unit 20, a separate, renewed determination of the position of the second vehicle 2 in relation to the first vehicle 1 or respectively of the corresponding extrinsic parameters can be effected for each individual image of the series of images. If applicable, a common set of extrinsic parameters can also be established in each case for a predetermined number of consecutive images, in order to reduce the processing load.

Based on the established position of the second vehicle 2 in relation to the first vehicle 1 or respectively the established extrinsic parameters for the second vehicle sensor unit 20 and, in particular, the extrinsic camera parameters for each camera 20-*i* of the second vehicle sensor unit 20, all of the image data provided by the first vehicle sensor unit 10 and the second vehicle sensor unit 20 can be subsequently combined with one another so as to obtain a common image of the surroundings. To this end, the distortion of the image data of each individual vehicle camera 10-*i* and 20-*i* of the first vehicle sensor unit 10 and of the second vehicle sensor unit 20 can, for example, be initially corrected and transformed into a common projection plane. In this case, the distortion correction of the image data of the individual vehicle cameras can, in particular, process the image data, which is possibly distorted due to the large aperture angle (fisheye lens), and transfer it into a uniform screen. The transformation of the image data into a predefined projection plane can, in this case, transfer the image data, for example, into a perspective from above (bird's eye perspective) or possibly also into a projection plane vertical to the road. In addition, transformations into any other projection planes are also possible.

The first image data, in particular the previously processed individual image data of the cameras 10-*i* of the first vehicle sensor unit 10 and the distortion-corrected second image data of the second vehicle sensor unit 20, which has been compensated in accordance with the extrinsic parameters, are subsequently combined so as to obtain a common entire image. In this case, the processed first image data and the processed second image data are combined so as to obtain an entire image of the surroundings, in which the images of the individual vehicle cameras 10-*i* and 20-*i* merge with one another as seamlessly as possible.

The processing of the first image data and the second image data such as, for example, the distortion correction of the image data, which is distorted, for example, due to lenses having a large aperture width, the processing of the image data based on the extrinsic parameters, the transforming of the image data into a predetermined image plane, etc. can, in this case, be carried out in particular by a graphics processing unit in the calculation unit 30. Such graphics processing units (GPU) are optimized for the processing of image data and allow, in comparison with conventional processors, a powerful processing of the image data. In particular, the processing of the image data can be carried out in such a graphics processing unit by suitable shader programs.

If this has not already been carried out previously, the obtained image of the surroundings can then also be transformed into a predetermined projection plane following the combination of the image data of the first image sensor unit 10 and of the second image sensor unit 20, if applicable. This projection plane can also, for example, be a top view of the vehicle combination from above (bird's eye perspective), a projection of the image data into the road plane or into a plane vertical to the road and, if applicable, also a plane vertical to the direction of movement of the first vehicle 1. In addition, any additional projection planes are likewise possible.

In order to further support the driver/operator, information regarding the second vehicle 2 in relation to the first vehicle 1 can additionally be inserted into the obtained image of the surroundings, if applicable. For example, a graphical model of the second vehicle 2 can be created in the calculation unit 30 based on predetermined model data or based on the detection results for the detection of the second vehicle in the first image data 1 of the first vehicle sensor unit 10. This graphical model of the second vehicle 2 can, for example, be a simple cubic body having the dimensions of the second vehicle 2. It is, in addition, also possible to obtain a line model with the outer contours of the second vehicle 2. In addition, modeling or respectively representation of the second vehicle 2, which is as accurate in every detail as possible, based on the first image data 1 and/or additional previously saved model data is possible. Such a model of the second vehicle 2 can subsequently be combined with the obtained image of the surroundings. For example, the obtained model can also be integrated as a semitransparent object into the obtained image of the surroundings. However, a complete superimposition, for example of a line model, with the outer contours and the obtained image of the surroundings is also possible.

In order to realistically represent the second vehicle 2 in the obtained image of the surroundings, a three-dimensional model can, in this case, also be obtained, for example, for the second vehicle 2. To this end, a known three-dimensional position of the individual cameras 10-*i* of the first vehicle sensor unit 10 can, in particular, be used on the first vehicle 1, in order to calculate a spatial model of the second vehicle 2 from the image data in the individual cameras 10-*i*. In order to calculate the spatial model of the second vehicle 2, for example, the image data in the two cameras 10-2 and 10-3 on the two outer sides of the first vehicle 1 can, in this case, be used. After a three-dimensional model of the second vehicle 2 has been calculated, the first image data of the cameras 10-*i* of the first vehicle sensor unit 10 can subsequently be projected onto the outer surfaces of the obtained three-dimensional model of the second vehicle 2. In this case, those segments in the first image data are, in particular, projected onto the outer surfaces of the model of the second vehicle 2, which correspond to the corresponding surfaces of the second vehicle 2. The obtained three-dimensional model having the areas of the first image data projected thereon can then be integrated into the obtained image of the surroundings. For example, to this end, a two-dimensional projection of the obtained three-dimensional model of the second vehicle 2 having the areas of the first image data projected thereon can be calculated first of all. The two-dimensional projection corresponds, in this case, to a projection into a plane which corresponds to the plane of the obtained image of the surroundings. This two-dimensional projection of the three-dimensional model of the second vehicle 2 can subsequently be integrated into the obtained image of the surroundings. For example, the two-dimensional projection of the three-dimensional model of the second vehicle 2 can, in this case, be partially superimposed with the obtained image of the surroundings. In this way, both the image of the surroundings and the positions of the second vehicle 2 in the image of the surroundings are immediately obvious to a driver/operator on viewing the obtained superimposition from the image of the surroundings and models of the second vehicle 2.

The insertion of the second vehicle 2 into the obtained image of the surroundings can, in this case, be optionally individually activated or respectively deactivated. For example, based on a user input, the insertion of the second vehicle two can be individually switched on in the obtained image of the surroundings. To this end, a user can, for example, by means of a suitable input device, for example a switch on the display unit 40 or another input element, activate or deactivate the superimposition of the obtained image of the surroundings with image data of the second vehicle 2. Alternatively, the second vehicle 2 can also be automatically inserted into the obtained image of the surroundings. To this end, predetermined driving situations or respectively maneuvers can possibly be detected, which subsequently activate or respectively deactivate an insertion of the second vehicle 2 into the obtained image of the surroundings. Furthermore, it is also possible to adjust the degree of transparency for the second vehicle 2 . . . superimposition with the image of the surroundings individually, for example based on a user input.

Additional options for combining an obtained model of the second vehicle 2 with the obtained image of the surroundings are, in addition, likewise possible. This superimposition of the obtained model for the second vehicle 2 with the obtained image of the surroundings can, in this case, be effected by a graphics processing unit in the calculation unit 30.

In particular, the extrinsic parameters for the second vehicle sensor unit 20 as well as, if applicable, for multiple cameras 20-*i* of the second vehicle sensor unit 20 can, in this case, be determined in real time in the calculation unit 30 by using a graphics processing unit. The high performance of graphics processing units makes it possible, in this case, to individually establish extrinsic parameters as well as combine all of the image data in real time. In this case, the extrinsic parameters as well as the combination for each image of the series of images can be executed separately for sequences of images having multiple consecutive individual images.

Figure 4:
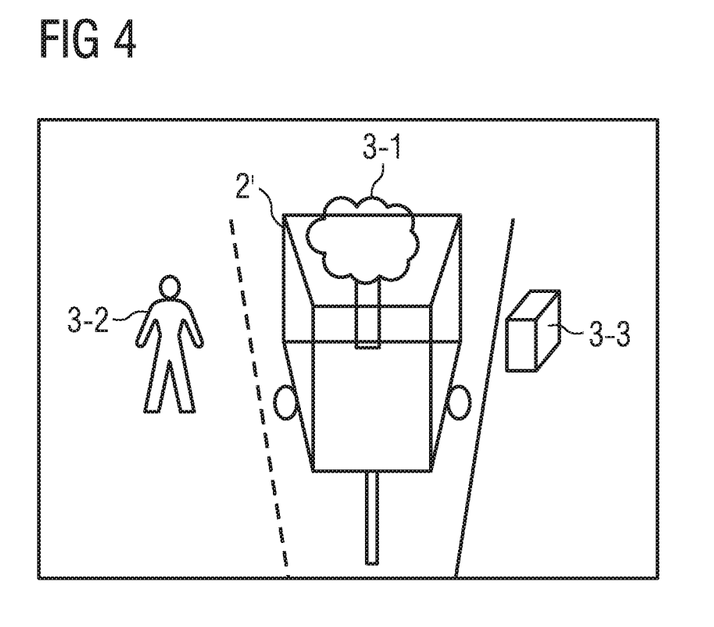
FIG. 4: shows a schematic representation of an image of the surroundings as obtained according to one embodiment.

FIG. 4 shows a schematic representation of an obtained image of the surroundings with a superimposing vehicle model, as has been obtained according to one embodiment. In this case, the image data of all the cameras of the first vehicle sensor unit 10 and the image data of the cameras of the second vehicle sensor unit 20 have been combined with one another. A driver/operator can, in this case, in addition to the objects 3-2 and 3-3 to the side of the second vehicle 2, also identify an object 3-1 which is located behind the second vehicle 2. Due to the processing of the image data, in particular the second image data of the second vehicle sensor unit 20, the entire image of the surroundings is, in this case, shown in a perspective which results from a view from the first vehicle 1. In order to provide a better orientation for the driver/operator, a line model 2' of the second vehicle 2 is, in this case, also integrated into the obtained image of the surroundings.

Figure 5:
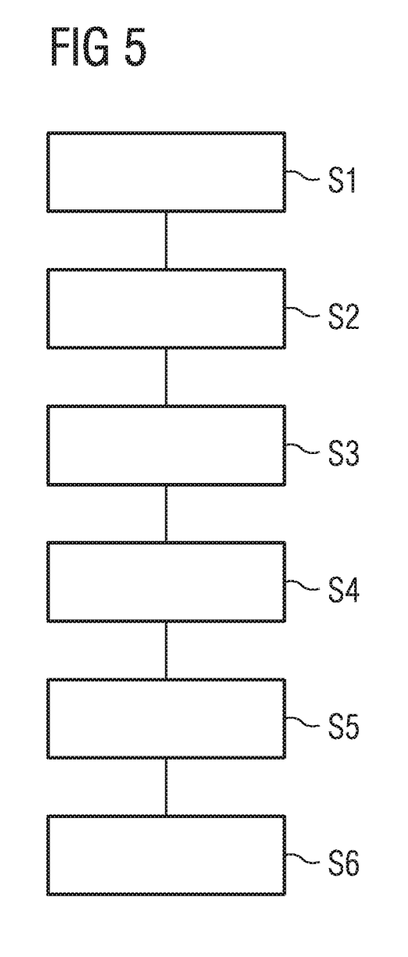
FIG. 5: shows a schematic representation of a flow chart as it forms the basis of a method according to one embodiment.

FIG. 5 shows a schematic representation of a flow chart, as it forms the basis of a method for displaying an image of the surroundings of a vehicle combination according to one embodiment. In a first step S1, first image data is provided, which is sensed by sensors by means of a first vehicle sensor unit arranged on a first vehicle. As already previously explained, the first vehicle sensor unit 10 can, in this case, include one or more vehicle cameras 10-i. Second image data is provided in an additional step S2. This second image data is sensed by means of a second vehicle sensor unit 20 arranged on a second vehicle. The second vehicle 2 is, in this case, mechanically coupled to the first vehicle 1. The first vehicle 1 and the second vehicle 2 consequently form a vehicle combination.

In step S3, a three-dimensional position of the second vehicle is subsequently established in relation to the first vehicle 1. The three-dimensional position of the second vehicle 2 in relation to the first vehicle 1 can, in this case, be sensed by means of a separate position sensor unit 35. Additionally or alternatively, the three-dimensional position of the second vehicle 2 in relation to the first vehicle 1 can also be effected based on the first image data provided by the first vehicle sensor unit 10. To this end, the second vehicle 2 can be detected in the first image data provided. Based on the size and three-dimensional position of the second vehicle 2 detected in the first image data, the three-dimensional position of the second vehicle 2 in relation to the first vehicle 1 can subsequently be established. In this case, the three-dimensional position can, in particular, include an angle between the first vehicle 1 and the second vehicle 2 as well as a distance between the two vehicles. Based on the established three-dimensional position between the two vehicles, extrinsic parameters for the second vehicle sensor unit 20 can subsequently be calculated. These extrinsic parameters can include a translation of the second vehicle sensor unit 20 in relation to the first vehicle or respectively the first vehicle sensor unit 10 into the three spatial directions. Furthermore, the extrinsic parameters can each specify a rotation about the axes of the spatial directions. If, in this case, the second vehicle sensor unit 20 includes multiple cameras 20-i, a separate set of extrinsic parameters can be calculated for each of these cameras 20-i. In this case, these extrinsic camera parameters are preferably calculated in real time. In particular, in the case of a sequence of multiple consecutive images, the extrinsic parameters are calculated separately for each image of this series of images.

In step S4, the first image data and the second image data are combined using the established three-dimensional position of the second vehicle 2 in relation to the first vehicle 1. In particular, the first image data and the second image data can, in this case, be combined using the calculated extrinsic parameters for the second vehicle sensor unit 20 or respectively individual extrinsic camera parameters for each camera 20-i in the second vehicle sensor unit 20. As a result of the combination of the first image data and the second image data, an image of the surroundings, which represents the surroundings of the combination of the first vehicle 1 and second vehicle 2, is consequently obtained.

If applicable, a graphical representation of the second vehicle 2 can subsequently be obtained in a step S5. This graphical representation of the second vehicle 2 can, in this case, either be a line model with the outer contours of the second vehicle 2, if applicable, a simple cubic modeling of the second vehicle 2 or, alternatively, also include a modeling of the second vehicle 2 which is accurate in every detail. In this case, in addition to the first image data of the first vehicle sensor unit 10, additional previously stored model data may also be used for the modeling of the second vehicle 2. The obtained graphical representation of the second vehicle can subsequently be integrated into the obtained image of the surroundings. For example, the graphical representation can be superimposed as a semi-transparent element with the obtained image of the surroundings.

The obtained image of the surroundings can subsequently be displayed on a vehicle display 40 in step S6.

To summarize, the invention relates to obtaining and representing a vehicle surroundings of a combination of two vehicles that are coupled to one another. According to the invention, image data is sensed by sensors on both of the combined vehicles. Taking into account the three-dimensional position of the vehicles relative to one another, the image data is then combined so as to obtain a common image of the surroundings. The obtained common image of the surroundings allows a driver/operator to efficiently and safely perceive the surroundings around the entire vehicle combination.

The invention claimed is:

1. A method for displaying an image of the surroundings of a vehicle combination, comprising:
    providing first image data sensed by a first vehicle sensor unit arranged on a first vehicle;
    providing second image data sensed by a second vehicle sensor unit arranged on a second vehicle;
    establishing a three-dimensional position of the second vehicle in relation to the first vehicle;
    combining the first image data and the second image data using the established three-dimensional position of the second vehicle in relation to the first vehicle in order to obtain an image of the surroundings;
    obtaining a graphical representation of the second vehicle;
    displaying the obtained image of the surroundings on a vehicle display; and
    selectively inserting the obtained graphical representation of the second vehicle into the display image as a function of the detection of at least one of predetermined driving situations and driving maneuvers such that an object that may be at least partially obscured by the second vehicle from the first vehicle sensor may be seen in concert with the graphical representation of second vehicle in displayed obtained image on the vehicle display.

2. The method according to claim 1, wherein image areas of the first vehicle sensor unit and the second vehicle sensor unit partially overlap.

3. The method according to claim 2, further comprising detecting the second vehicle in the first image data provided and wherein establishing the three-dimensional position of the second vehicle in relation to the first vehicle utilizes the detection result for the detection of the second vehicle in the first image data.

4. The method according to claim 3, wherein establishing the three-dimensional position of the second vehicle in relation to the first vehicle includes establishing at least one of an angle and a distance between the first vehicle and the second vehicle.

5. The method according to claim 4, wherein obtaining a graphical representation of the second vehicle includes obtaining a three-dimensional model of the second vehicle and projecting first image data of the second vehicle onto outer surfaces of the obtained three-dimensional model of the second vehicle.

6. The method according to claim 5, further comprising transforming the first image data sensed by sensors and the second image data sensed by sensors into a predetermined projection plane,
wherein combining the first image data and the second image data in order to obtain the image of the surroundings utilizes the transformed first image data and the transformed second image data.

7. The method according to claim 6, further comprising transforming the obtained image of the surroundings into a predetermined perspective.

8. The method according to claim 7, wherein the first image data and the second image data are each supplied by at least one camera.

9. The method according to claim 8, further comprising calculating extrinsic parameters of a camera of the second vehicle sensor unit.

10. The method according to claim 9, wherein the extrinsic parameters are calculated in real time.

11. A device for displaying an image of the surroundings of a vehicle combination, comprising:
a first vehicle sensor unit disposed on a first vehicle and configured to provide first image data;
a second vehicle sensor unit disposed on a second vehicle and configured to provide second image data;
a calculation unit configured to establish a three-dimensional position of the second vehicle in relation to the first vehicle, and to combine the first image data and the second image data using the established three-dimensional position of the second vehicle in relation to the first vehicle, in order to obtain an image of the surroundings, which is displayed on a vehicle display connected to the calculation unit;
wherein the calculation unit is further configured to establish a graphical representation of the second vehicle, and to selectively insert the obtained graphical representation of the second vehicle into the display image as a function of at least one of a detected predetermined driving situation and a detected driving maneuver such that an object that may be at least partially obscured by the second vehicle from the first vehicle sensor may be seen in concert with the graphical representation of second vehicle in displayed obtained image on the vehicle display.

12. The device according to claim 11, wherein the calculation unit includes a graphics processing unit.

13. The device according to claim 12, further including a position sensor unit to sense at least one of an angle and a distance between the first vehicle and the second vehicle and to provide the at least one of the angle and the distance to the calculation unit.

14. The device according to claim 13, wherein the first vehicle sensor unit and/or the second vehicle sensor unit respectively includes at least one vehicle camera.

* * * * *